No. 782,084. PATENTED FEB. 7, 1905.
C. E. THEURER.
WHIP OPERATING MECHANISM.
APPLICATION FILED MAY 7, 1904.
2 SHEETS—SHEET 1.
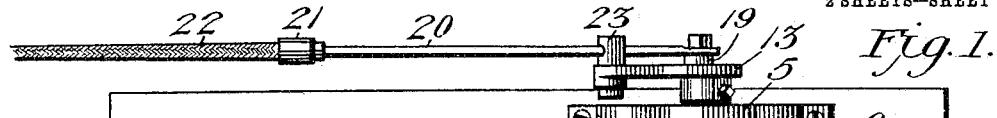
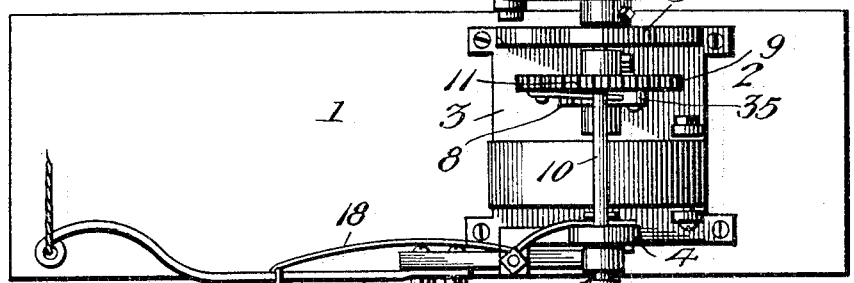
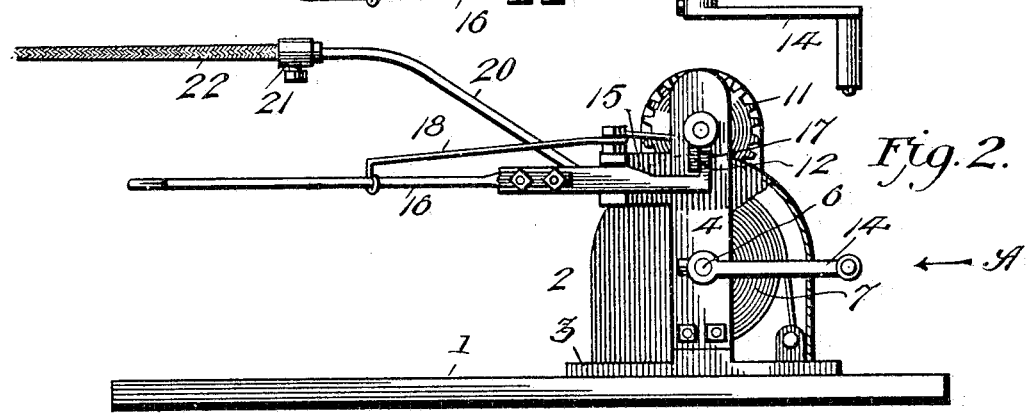
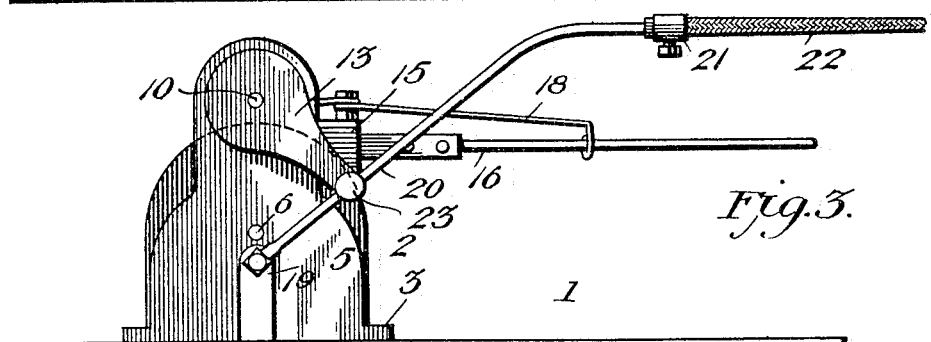
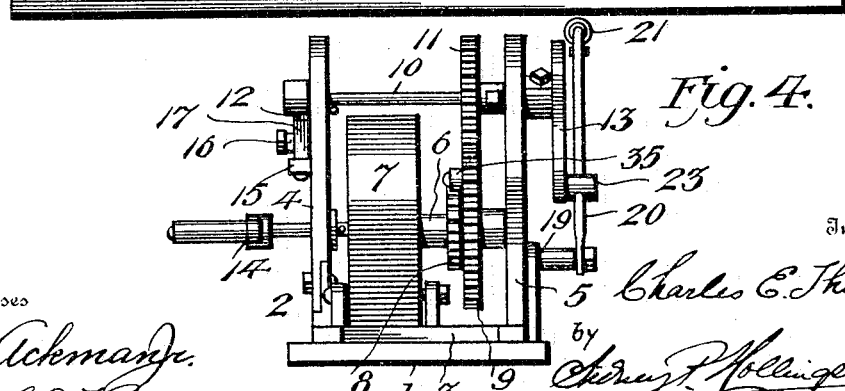

No. 782,084. PATENTED FEB. 7, 1905.
C. E. THEURER.
WHIP OPERATING MECHANISM.
APPLICATION FILED MAY 7, 1904.
2 SHEETS—SHEET 2.
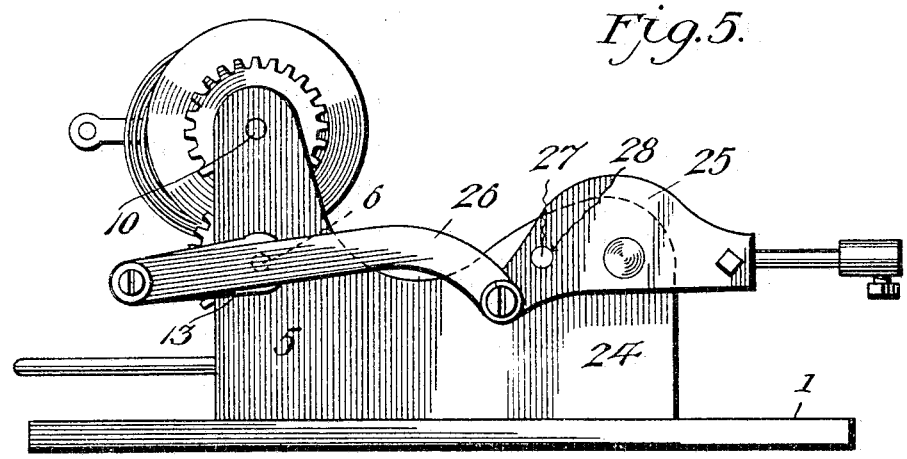
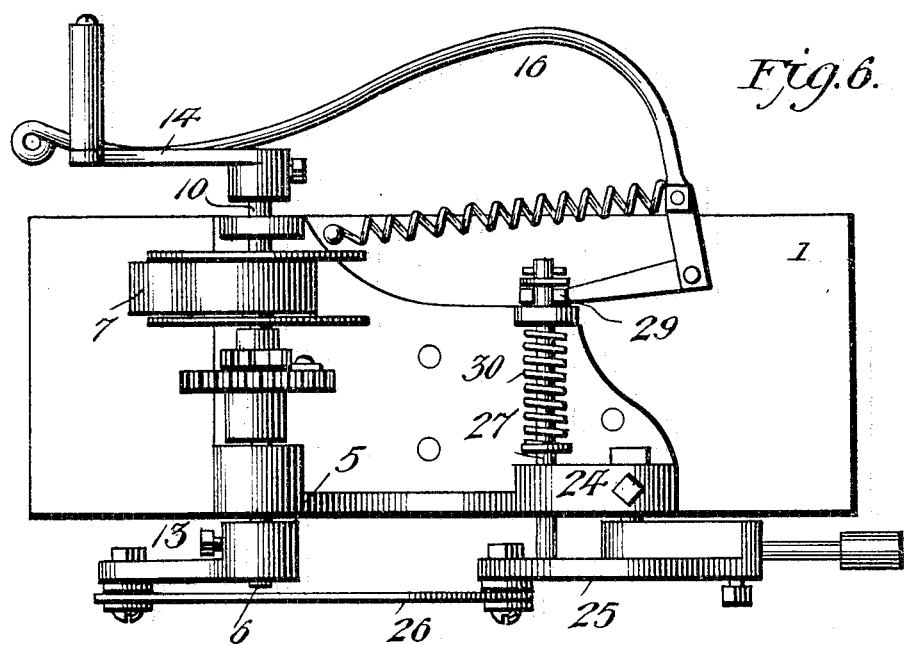

No. 782,084. Patented February 7, 1905.

UNITED STATES PATENT OFFICE.

CHARLES E. THEURER, OF SIDNEY, OHIO, ASSIGNOR TO WILLIAM ETHERINGTON AND WILLIAM HEISER, OF SIDNEY, OHIO.

WHIP-OPERATING MECHANISM.

SPECIFICATION forming part of Letters Patent No. 782,084, dated February 7, 1905.

Application filed May 7, 1904. Serial No. 206,919.

*To all whom it may concern:*

Be it known that I, CHARLES E. THEURER, a citizen of the United States, residing at Sidney, in the county of Shelby and State of Ohio, have invented new and useful Improvements in Whip-Operating Mechanism, of which the following is a specification.

This invention relates to a whip-operating mechanism to be employed, primarily, in stalls where horses are kept for emergency purposes—such as fire-engine houses, police-stations, ambulance-stables, &c.—where it is necessary for the horses to leave their stalls the instant the stall-doors are opened. At times a horse will refuse to leave its stall after the door is opened and the alarm sounded, and much time, comparatively, is lost in getting him in position to be hitched up. It is to overcome this trouble that my invention is designed.

It consists, briefly, of a mechanism driven by a spring or other suitable power placed above or in rear of a stall and adapted to operate a whip which when the mechanism is tripped will suddenly strike the horse a series of quick sharp blows on his back or flanks with such suddenness that he will immediately start forward to escape the whip and pass out of the stall to be taken in charge by the person in waiting.

In the accompanying drawings, Figure 1 is a plan view of my improved whip-operating mechanism. Figs. 2 and 3 are views from opposite sides. Fig. 4 is a view looking in the direction indicated by the arrow A, Fig. 2. Figs. 5 and 6 are respective plan and side views of a modified form of my invention.

Similar reference-numerals indicate the same parts on all the figures.

1 indicates a base-board on which my whip-operating mechanism is mounted. This board is not a necessary part of the invention; but as it affords a convenient means for attaching the device to a wall, partition, or other suitable place I have shown it on the drawings. On the board 1 I secure a frame 2, formed of a base-plate 3 and two projecting arms 4 and 5, which support the various parts of the operative mechanism.

6 is a shaft journaled in the arms 4 and 5, to which shaft one end of a coiled spring 7 is attached. Its other end is fastened to the frame 2. Besides the spring 7 the shaft carries a fixed ratchet-wheel 8 and a loose gear-wheel 9. Above the shaft 6 is a second shaft 10, parallel to the shaft 6, on which is a fixed gear-wheel 11, meshing with the gear 9, a finger 12, and a crank 13. The finger 12 is placed outside the projecting arm 4, while the crank 13 is similarly situated with respect to the arm 5. On the outer end of the shaft 6 is placed a hand-crank 14, by means of which the spring 7 is wound. A pawl 35 on the gear-wheel 9 is in engagement with the teeth of the ratchet-wheel 8 on the shaft 6 to prevent the spring from unwinding without rotating the gear-wheel 9.

On the projecting arm 4 is a bearing 15, in which a hand-lever 16 is pivoted. A lug 17 on the inner end of the hand-lever 16 normally engages the finger 12 on the shaft 10 and prevents the device from operating. When, however, the hand-lever is pushed inwardly and held, the lug 17 is disengaged from the finger 12, and the mechanism will run until the spring is exhausted or the hand-lever released, which will then be returned to its normal position by the spring 18, and the lug 17 thereon will catch and hold the finger 12.

A stud 19 on the projecting arm 5 is the pivotal point for one end of a vibrating rod 20. Its other and outer end is curved and provided with a socket 21 to hold a whip 22. The straight portion of the rod passes freely through a pin 23, pivoted in the end of the crank 13 on the shaft 10. As thus arranged when the mechanism is tripped by the hand-lever 16 the shaft 6 is rotated, carrying the crank 13 with it, thereby giving the vibrating lever 20 a more or less rapid to-and-fro movement on its pivot 19 and causing the whip 22 to make a number of quick strokes.

In the modified form of my invention illustrated in Figs. 5 and 6 the shafts 6 and 10 are in reverse position and the projecting arm 5 has an extension, as at 24, on which a rocking lever 25 is pivoted. This lever carries the whip-socket and whip, as shown. A link 26 connects the crank 13 with the vibrating lever 25, by means of which connection the lever 25 receives a rocking motion when the crank 13 rotates. If desired, the same tripping mechanism used on the preferred form of device may be applied to this arrangement; but in lieu thereof I have mounted on the frame a sliding pin 27, one end of which enters a hole 28 in the vibrating lever 25 to hold it from moving, while its other end is fitted to a fork 29 on one end of the hand-lever 16. A spring 30 returns the pin 27 to normal after it has been withdrawn from the hole 28 by the hand-lever.

The base-board 1 is fastened to the ceiling or stall back of a horse and a wire or cord, if necessary, connected to the hand-lever and carried to some position where it can be conveniently and quickly reached. When the door of the stall is thrown open and the horse refuses to respond quickly, the hand-lever is operated directly or through the wire, releasing the mechanism, which by its action strikes the horse a series of blows, the number depending on the length of time the mechanism is held unchecked. As soon as the horse leaves his stall the hand-lever is released and the mechanism stops automatically.

Having thus described my invention, I claim—

1. In a whip-operating mechanism, a source of power, a crank rotated by said power, a whip-holder adapted to be continuously vibrated by said crank, and a trip device adapted to start and stop the rotation of said crank.

2. In a whip-operating mechanism, a source of power, a rotatable crank, power-transmitting means between the source of power and said crank, a whip-holder adapted to be continuously vibrated by the rotation of said crank, a connection between said crank and whip-holder, and a tripping device.

3. In a whip-operating mechanism, a source of power, a rotatable crank, power-transmitting means between the source of power and said crank, a vibrating whip-holder, and a pin on said crank adapted to slide on said vibrating whip-holder.

4. In a whip-operating mechanism, a source of power, gearing operated thereby, a rotatable crank operated through said gearing, a finger turning in unison with said crank, a whip-holder adapted to be vibrated by said crank, and a lever normally in engagement with said finger but adapted to be disconnected therefrom, to permit said crank to rotate.

5. In a whip-operating mechanism, a source of power, a shaft adapted to be rotated thereby, a second shaft, and gearing between said shafts, a crank, and a finger on said second shaft, a vibrating whip-holder operated by said crank, and a tripping device controlling the movement of said finger.

In testimony whereof I affix my signature in presence of two witnesses.

CHARLES E. THEURER.

Witnesses:
 CELIA JOHNSTON,
 E. S. MAXWELL.